Patented Feb. 8, 1949

2,460,824

UNITED STATES PATENT OFFICE 2,460,824

ACYLATING FURANS

Howard D. Hartough, Pitman, N. J., and Alvin I. Kosak, Columbus, Ohio, assignors to Socony-Vacuum Oil Company, Incorporated, a corporation of New York No Drawing. Application April 24, 1946, Serial No. 664,714

20 Claims. (Cl. 260—345)

This invention relates to a process for the acylation of furans and, more particularly, is directed to a catalytic method for acylating furan and its derivatives with an organic carboxylic acid.

Acylation reactions are well known in the art and connote the union between acyl radicals and molecules of organic compounds. The products thus produced represent structurally the substitution of an acyl radical on the organic compound molecule with the elimination of a hydrogen atom.

Acyl radicals may be furnished in acylation reactions by various materials commonly referred to as acylating agents. Thus, the anhydrides of carboxylic acids and acyl halides have served as sources of the acyl radical. In particular, acetic anhydride and acetyl chloride have found wide application as acylating agents.

The acylation of furan and furan derivatives has previously been carried out employing one of the above mentioned acylating agents in the presence of various catalysts of the Friedel-Crafts type, such as stannic chloride, ferric chloride, aluminum chloride and titanium tetrachloride.

It has been recognized by those in the art that the use of an organic carboxylic acid for acylation purposes would be of extreme advantage in eliminating the necessity of preparing the corresponding acid anhydrides or halides and hence effecting a considerable saving in the acylation process. Thus, the acylation of aromatic compounds has in the past been accomplished with carboxylic acids employing relatively large amounts of aluminum chloride as a catalyst, that is, amounts of the order of 2-3 moles of catalyst per mole of acid used. Attempts to acylate furan, however, under similar conditions, employing a carboxylic acid in the presence of aluminum chloride, proved futile and no acylated furan was obtained by this method.

It has now been found that by employing phosphorus pentoxide as a catalyst, acylation of furan can be accomplished using an organic carboxylic acid as acylating agent. The use of a carboxylic acid as acylating agent is of a very practical importance since the expense and time consumed in preparing the acylating agents formerly employed, namely, acid anhydrides and halides, can thereby be eliminated, resulting in an efficient and economical acylation process. Moreover, it has been found in accordance with the present invention that relatively small amounts of phosphorus pentoxide catalyst, that is, amounts of 1 mole or less per mole of carboxylic acid used, may be effectively employed in promoting the acylation.

It is accordingly an object of the present invention to provide an efficient process for synthesizing acylated furans. Another object is to provide a process for catalytically acylating furan and its derivatives. A still further object is to afford a process for catalytically acylating furan in a direct manner which can be easily carried out with a relatively inexpensive acylating agent. A very important object is to provide a process capable of reacting furan or its derivatives with an organic carboxylic acid in the presence of a catalyst to yield an acylated furan.

These and other objects which will be recognized by those skilled in the art are attained in accordance with the present invention wherein furan or its derivatives are acylated by reaction with organic carboxylic acids in the presence of phosphorus pentoxide.

The process of this invention thus comprises the contacting of furan or furan derivative, carboxylic acid and phosphorus pentoxide preferably in the presence of an inert diluent, such as benzene, to avoid excessive charring for a sufficient period of time and at a suitable temperature to yield, after neutralization and distillation of the resulting product, an acylated furan. The process may be carried out employing equimolar quantities of furan and carboxylic acid. However, the presence of an excess of furan has generally been found to give an increased yield of the desired product.

The quantity of phosphorus pentoxide used herein may be conveniently expressed in terms of mole ratio as compared with the amount of carboxylic acid acylating agent used. Thus, the amount of phosphorus pentoxide employed will generally be between about 0.05 and about 1.0 mole per mole of carboxylic acid. However, these amounts, while preferable, are not to be considered as critical since the present invention contemplates the use, generally, of phosphorus pentoxide as a catalyst in promoting the acylation of furans with a carboxylic acid.

The temperature at which the reaction is carried out may vary over a wide extent, the upper limit being dependent on the boiling point of the reactants at the specific pressure of the reaction. Temperatures varying between about —20° C. and about 100° C. have been found satisfactory for effecting the acylation. However, generally, it is preferable to employ temperatures in the range of from about 0° C. to about 25° C. Pressures varying between about 1 and about 10 atmospheres have been found satisfactory in the acylation process. The effect of increased pressure, theoretically, is toward increased reaction but, from a practical standpoint, this is not a very great effect with reactions such as involved herein which go readily at normal pressures. The particular temperatures to be employed will depend on the time of reaction and on the carboxylic acid used. Ordinarily, a pressure sufficient to maintain the reactants in the liquid phase is employed and this is more or less dependent on the particular temperature involved. As a general rule, the higher the temperature, the higher the pressure and the lower the reaction time needed. It is, of course, to be understood that these reaction variables are more or less interdependent. The reaction period will usually, however, vary from about one to about 10 hours under the ordinary reaction conditions.

The carboxylic acids used herein may be either aliphatic or aromatic and may be either saturated or unsaturated. Carboxylic acids of either aliphatic or aromatic derivatives may likewise be employed with advantage. Thus, representative carboxylic acids to be used in this invention include the saturated fatty acids, such as acetic acid, propionic acid, etc.; and aromatic acids, such as benzoic acid and substituted benzoic acids. These carboxylic acids are given merely by way of example and are not to be construed as limiting since other organic carboxylic acids which will readily suggest themselves to those skilled in the art may likewise be used.

The process contemplated herein, however, has been found to be particularly adaptable to the preparation of the higher furyl ketones, that is, those derivatives having long chain acyl groups attached to the furan ring. Indeed, it would appear that the yield of desired ketone is directly related to the chain length of the carboxylic acid acylating agent used. Thus, when phosphorus pentoxide and acetic acid are employed in preparing acetylfuran, a relatively large amount of undesirable tarry material is formed, which tends to decrease the yield of desired product. This phenomena unexpectedly is not encountered when the higher fatty acids or other long chain acids having more than 2 carbon atoms and preferably 6 or more carbon atoms, such as capric acid and benzoic acid, are used. The result is, as will be shown hereinafter, that correspondingly high yields of the long chain furyl ketones are obtained.

In addition to furan, derivatives of furan having one or more substituent groups, such as halogen, alkyl, aryl, or alkoxy groups attached to the furan ring may likewise be acylated in accordance with this invention. Other furan derivatives, including those having substituents of a highly inactive character, such as carbonyl, carboxylic ester, nitro and cyano groups, may also be acylated in the presence of phosphorus pentoxide catalyst.

The following examples are for the purpose of illustrating modes of effecting acylation of furan in accordance with the process of this invention. It is to be clearly understood that this invention is not to be construed as limited to the specific conditions or carboxylic acid set forth.

*Example 1*

To 300 milliliters of benzene were added 142 grams (1 mole) of phosphorus pentoxide. The mixture was cooled and 60 grams (1 mole) of acetic acid were added slowly. The mixture was stirred for about 1 hour at room temperature and then 80 grams of furan were added. After stirring at room temperature for an additional 30 minutes, the mixture was heated at a temperature of 65-75° C. for a period of 5 hours. A heavy, black, tarry material formed. The benzene layer was decanted, washed with sodium hydroxide solution, and the benzene removed by distillation. The residue, upon distillation under reduced pressure, yielded 5 grams of 2-acetylfuran, having a melting point of 30-32° C. The oxime of this material melted at 102-103.5° C., and the 2,4-dinitrophenylhydrazone at 219-220° C.

*Example 2*

To 500 milliliters of benzene were added 71 grams (0.5 mole) of phosphorus pentoxide and 122 grams (1 mole) of benzoic acid. The mixture was heated to reflux for 1 hour. After cooling to room temperature, 80 grams of furan were added and the mixture was stirred for a period of 5 hours at room temperature. The benzene soluble material was decanted and washed with dilute sodium hydroxide solution until neutral. The benzene was removed by distillation and, upon further distillation of the residue under reduced pressure, 67 grams (78 per cent of theory) of 2-benzoylfuran were obtained. The product had a melting point of 43.5-44° C. The oxime melted at 121-122° C. and the semicarbazone at 210-211° C.

*Example 3*

To 300 milliliters of benzene were added 142 grams (1 mole) of phosphorus pentoxide and 74 grams (1 mole) of capric acid. The mixture was heated to reflux for 1 hour, cooled to room temperature, and 80 grams of furan were added. The mixture was then stirred at room temperature for 4 hours and at the end of this period, the benzene layer was decanted, washed with dilute sodium hydroxide solution, and the benzene removed by distillation. The residue, upon distillation under reduced pressure, yielded 40 grams of 2-caprylfuran.

*Example 4*

To 300 milliliters of benzene were added 142 grams (1 mole) of phosphorus pentoxide. The mixture was cooled and 60 grams (1 mole) of acetic acid were slowly added. The mixture was stirred for 1 hour at room temperature and then 80 grams of furan were added. The mixture was then stirred at room temperature for an additional 5 hours. The benzene layer was then decanted, washed with dilute sodium hydroxide solution and the benzene removed by distillation. Upon distillation of the residue under reduced pressure, 8 grams of 2-acetylfuran were obtained.

*Example 5*

To 300 milliliters of benzene were added 71 grams (0.5 mole) of phosphorus pentoxide and 74 grams (1 mole) of capric acid. The mixture was heated to reflux for 1 hour, cooled to room temperature, and 80 grams of furan were added. The mixture was then stirred at room temperature for a period of 4 hours. At the end of this time, the benzene layer was decanted, washed with dilute sodium hydroxide solution and the benzene removed by distillation. The residue, upon distillation under reduced pressure, yielded 23 grams of 2-caprylfuran along with 9 grams of tarry residue.

From the above examples, it will be seen that phosphorus pentoxide is an effective catalyst in promoting the acylation furan with carboxylic acids. Moreover, as pointed out above, the acylation process described herein is particularly effective in producing the higher furyl ketones. Thus, the process of the present invention affords a convenient and efficient one-step method in preparing furyl ketones from carboxylic acids and furans.

The acylated furans as produced in accordance with the process described herein have found a variety of uses and may be employed as solvents, addition agents for petroleum fractions, plasticizers, resin intermediates, and intermediates for chemical synthesis. Long chain alkyl furyl ketones may be utilized as synthetic lubricants, di-electrics, waxes and extreme pressure additives for mineral oils.

We claim:

1. A process for nuclear acylation of a furan, comprising reacting the same with a carboxylic acid in the presence of phosphorus pentoxide.

2. A process for nuclear acylation of a furan, comprising reacting the same with an aliphatic carboxylic acid in the presence of phosphorus pentoxide.

3. A process for nuclear acylation of a furan, comprising reacting the same with an aromatic carboxylic acid in the presence of phosphorus pentoxide.

4. A process for nuclear acylation of a furan, comprising reacting the same with a saturated fatty acid in the presence of phosphorus pentoxide.

5. A process for nuclear acylation of a furan, comprising reacting the same with a carboxylic acid having more than 2 carbon atoms in the presence of phosphorus pentoxide.

6. A process for nuclear acylation of a furan, comprising reacting the same with acetic acid in the presence of phosphorus pentoxide.

7. A process for nuclear acylation of a furan, comprising reacting the same with capric acid in the presence of phosphorus pentoxide.

8. A process for nuclear acylation of a furan, comprising reacting the same with benzoic acid in the presence of phosphorus pentoxide.

9. A process for nuclear acylation of a furan, comprising reacting the same with a carboxylic acid in the presence of an amount of phosphorus pentoxide between about 0.05 and about 1.0 mole per mole of said acid.

10. A process for nuclear acylation of a furan, comprising reacting the same with a carboxylic acid having more than 2 carbon atoms in the presence of an amount of phosphorus pentoxide between about 0.05 and about 1.0 mole per mole of said acid.

11. A process for nuclear acylation of a furan, comprising reacting the same with acetic acid in the presence of an amount of phosphorus pentoxide between about 0.05 and about 1.0 mole per mole of acid.

12. A process for nuclear acylation of a furan, comprising reacting the same with capric acid in the presence of an amount of phosphorus pentoxide between about 0.05 and about 1.0 mole per mole of acid.

13. A process for nuclear acylation of a furan, comprising reacting the same with benzoic acid in the presence of an amount of phosphorus pentoxide between about 0.05 and about 1.0 mole per mole of acid.

14. A process for nuclear acylation of a furan, comprising reacting the same with a carboxylic acid at a temperature between about —20° C. and about 100° C. for a period of from about 1 hour to about 10 hours in the presence of an amount of phosphorus pentoxide between about 0.05 and about 1.0 mole per mole of acid.

15. A process for nuclear acylation of a furan, comprising reacting the same with a saturated fatty acid at a temperature between about —20° C. and about 100° C. for a period of from about 1 hour to about 10 hours in the presence of an amount of phosphorus pentoxide between about 0.05 and about 1.0 mole per mole of acid.

16. A process for nuclear acylation of a furan, comprising reacting the same with an aromatic acid at a temperature between about —20° C. and about 100° C. for a period of from about 1 hour to about 10 hours in the presence of an amount of phosphorus pentoxide between about 0.05 and about 1.0 mole per mole of acid.

17. A process for nuclear acylation of a furan, comprising reacting the same with an unsaturated carboxylic acid at a temperature between about —20° C. and about 100° C. for a period of from about 1 hour to about 10 hours in the presence of an amount of phosphorus pentoxide between about 0.05 and about 1.0 mole per mole of acid.

18. A process for nuclear acylation of a furan, comprising reacting the same with a carboxylic acid having at least 6 carbon atoms at a temperature between about —20 C. and about 100° C. for a period of from about 1 hour to about 10 hours in the presence of an amount of phosphorus pentoxide between about 0.05 and about 1.0 mole per mole of acid.

19. A process for the acylation of furan, comprising reacting furan with a carboxylic acid in the presence of phosphorus pentoxide.

20. A process for the acylation of furan, comprising reacting furan with a carboxylic acid having at least 6 carbon atoms in the presence of between about 0.05 and about 1.0 mole of phosphorus pentoxide per mole of acid.

HOWARD D. HARTOUGH.
ALVIN I. KOSAK.

REFERENCES CITED

The following references are of record in the file of this patent:

Annalen 424, 1 (1921).
Chemical Reviews, vol. 17, 1935, pages 360, 361, 374 to 377.
Chemical Abstracts 33: 6813; 9 (1939).
Berkman, Catalysis, page 658, Reinhold Pub. Co., 1940.